United States Patent
Novet et al.

(10) Patent No.: US 7,499,214 B2
(45) Date of Patent: Mar. 3, 2009

(54) AMBIENT LIGHT ABSORBING SCREEN

(75) Inventors: Thomas E Novet, Corvallis, OR (US); Gilbert G Smith, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 183 days.

(21) Appl. No.: 11/590,506

(22) Filed: Oct. 31, 2006

(65) Prior Publication Data

US 2007/0217005 A1 Sep. 20, 2007

Related U.S. Application Data

(63) Continuation-in-part of application No. 11/496,774, filed on Jul. 31, 2006.

(60) Provisional application No. 60/784,125, filed on Mar. 20, 2006.

(51) Int. Cl.
*G03B 21/60* (2006.01)

(52) U.S. Cl. .................................... 359/459

(58) Field of Classification Search ......... 359/454–456, 359/449, 459, 451
See application file for complete search history.

(56) References Cited

U.S. PATENT DOCUMENTS

| | | | |
|---|---|---|---|
| 1,279,262 A | 9/1918 | Clark | |
| 3,180,214 A | 4/1965 | Fox | |
| 3,191,495 A | 6/1965 | Miller | |
| 4,235,513 A | 11/1980 | Vlahos | |
| 4,241,980 A * | 12/1980 | Mihalakis et al. | 359/455 |
| 4,373,784 A | 2/1983 | Nonomura et al. | |
| 4,662,746 A | 5/1987 | Hornbeck | |
| 4,811,003 A | 3/1989 | Strathman et al. | |
| 4,956,619 A | 9/1990 | Hornbeck | |
| 5,061,049 A | 10/1991 | Hornbeck | |
| 5,083,857 A | 1/1992 | Hornbeck | |
| 5,146,356 A | 9/1992 | Carlson | |
| 5,210,641 A | 5/1993 | Lewis | |
| 5,309,241 A | 5/1994 | Hoagland | |
| 5,317,409 A | 5/1994 | Macocs | |
| 5,319,744 A | 6/1994 | Kelly et al. | |
| 5,386,253 A | 1/1995 | Fielding | |
| 5,402,184 A | 3/1995 | O'Grady et al. | |
| 5,475,533 A * | 12/1995 | Steenblik et al. | 359/628 |
| 5,490,009 A | 2/1996 | Venkateswar et al. | |

(Continued)

FOREIGN PATENT DOCUMENTS

EP 0 311 189 A1 9/1988

(Continued)

OTHER PUBLICATIONS

Katagiri et al.; High Contrast Front Projection Display System Optimizing the Projected Light Angle Range; IDW 2003, pp. 1569-1572.

(Continued)

*Primary Examiner*—Christopher Mahoney

(57) ABSTRACT

A projection screen for receiving projector light from a projector facing direction includes a substrate having a plurality of features. Each of the features includes a reflective surface oriented to the projector facing direction. Each of the reflective surfaces is curved in a first direction to provide a desired horizontal viewing angle, and is curved in a second direction to provide a desired vertical viewing angle.

19 Claims, 14 Drawing Sheets

U.S. PATENT DOCUMENTS

| | | | |
|---|---|---|---|
| 5,557,353 | A | 9/1996 | Stahl |
| 5,689,283 | A | 11/1997 | Shirochi |
| 5,696,625 | A | 12/1997 | Malifaud et al. |
| 5,751,379 | A | 5/1998 | Markandey et al. |
| 5,842,762 | A | 12/1998 | Clarke |
| 5,897,191 | A | 4/1999 | Clarke |
| 5,912,773 | A | 6/1999 | Barnett et al. |
| 5,914,825 | A | 6/1999 | Nishio et al. |
| 5,920,365 | A | 7/1999 | Eriksson |
| 5,953,148 | A | 9/1999 | Moseley et al. |
| 5,978,518 | A | 11/1999 | Oliyide et al. |
| 6,025,951 | A | 2/2000 | Swart et al. |
| 6,067,143 | A | 5/2000 | Tomita |
| 6,104,375 | A | 8/2000 | Lam |
| 6,118,584 | A | 9/2000 | Van Berkel et al. |
| 6,141,039 | A | 10/2000 | Poetsch |
| 6,184,969 | B1 | 2/2001 | Fergason |
| 6,219,017 | B1 | 4/2001 | Shimada et al. |
| 6,239,783 | B1 | 5/2001 | Hill et al. |
| 6,243,055 | B1 | 6/2001 | Fergason |
| 6,313,888 | B1 | 11/2001 | Tabata |
| 6,317,171 | B1 | 11/2001 | Dewald |
| 6,384,816 | B1 | 5/2002 | Tabata |
| 6,390,050 | B2 | 5/2002 | Feikus |
| 6,393,145 | B2 | 5/2002 | Betrisey et al. |
| 6,456,339 | B1 | 9/2002 | Surati et al. |
| 6,522,356 | B1 | 2/2003 | Watanabe |
| 6,600,600 | B2 * | 7/2003 | Chen .......................... 359/459 |
| 6,657,603 | B1 | 12/2003 | Demetrescu et al. |
| 6,695,451 | B1 | 2/2004 | Yamasaki et al. |
| 6,728,032 | B2 | 4/2004 | Peterson et al. |
| 6,847,483 | B2 | 1/2005 | Lippey et al. |
| 6,859,314 | B2 | 2/2005 | Yoon et al. |
| 7,019,713 | B2 | 3/2006 | Hereld et al. |
| 7,038,727 | B2 | 5/2006 | Majumder et al. |
| 7,110,176 | B2 * | 9/2006 | Maruta et al. ............... 359/459 |
| 2002/0022940 | A1 | 2/2002 | Chen |
| 2003/0020809 | A1 | 1/2003 | Gibbon et al. |
| 2003/0076325 | A1 | 4/2003 | Thrasher |
| 2003/0090597 | A1 | 5/2003 | Katoh et al. |
| 2004/0239885 | A1 | 12/2004 | Jaynes et al. |
| 2005/0002095 | A1 | 1/2005 | Hibi |
| 2005/0200952 | A1 | 9/2005 | Niwa et al. |

FOREIGN PATENT DOCUMENTS

| | | | |
|---|---|---|---|
| EP | 0 311 189 | A1 | 4/1989 |
| EP | 0 421 809 | A3 | 10/1990 |
| EP | 0 421 809 | A2 | 4/1991 |
| EP | 1 001 306 | A2 | 5/2000 |

OTHER PUBLICATIONS

M. Brown et al., "A practical and flexible tiled display system." In Pacific Conf. on Comp. Graphics and Apps., 2002.

N. Chang, "Efficient dense correspondences using temporally-encoded light patterns." IEEE Intl. Workshop on on Projector-Camera Systems, Oct. 12, 2003, Nice, France.

A. Majumder et al. "Perceptual photometric seamlessness in projection-based tiled displays." In ACM Transactions on Graphics, vol. 24, No. 1, pp. 118-139, 2005.

A. Raij et al. "PixelFlex2: a comprehensive, automatic, causally-aligned multiprojector display". IEEE Intl. Workshop on Projector-Camera Systems, Oct. 12, 2003, Nice, FR.

R. Raskar et al. "Seamless projection overlaps using image warping and intensity blending." In Intl. Conf. on Virtual Systems and Multimedia, Gifu Japan, 1998.

R. Raskar et al. "Multiprojector displays using camera-based registration." In IEEE Visualization, p. 161-168, 1999.

R. Raskar et al. "iLamps: Geometrically Aware and Self-Configuring Projectors". In ACM Transactions on Graphics, vol. 22, No. 3, pp. 809-818, 2003.

R. Surati. Scalable self-calibrating display technology for seamless large-scale displays. Ph.D. thesis, Dept. of Computer Science, MIT, 1998.

R. Szeliski. "Video Mosaics for Virtual Environments", IEEE Computer Graphics and Applications, pp. 22-30, Mar. 1996.

Tanguay, Donald et al., "Nizza: A Framework for Developing Real-time Streaming Multimedia Applications", HP Laboratories, HPL-2004-132, Aug. 2, 2004, 9 pages.

C. Jaynes et al., "Super-Resolution Composition in Multi-Projector Display's," IEEE Int'l Workshop on Projector-Camera Systems, Oct. 2003; 8 pgs.

L.M Chen & S. Hasagawa, "Visual Resolution Limits for Color Matrix Displays—One Panel Projectors", vol. 13, pp. 221-226, 1992.

A. Yasuda et al., "FLC Wobbling for High Resolution Projectors", Journal of the SID, May 1997, pp. 229-305.

T. Tokita et al., "P-108: FLC Resolution-Enhancing Device for Projection Displays", SID 02 Digest 2002, pp. 638-641.

D.K. Kelley, "Motion and Vision—II. Stabilized Spatio-Temporal Threshold Surface", Journal of the Optical Society of America, vol. 69, No. 10, Oct. 1979.

Candice H. Brown Elliott et al., "Color Subpixel Rendering Projectors and Flat Panel Displays"; SMPTE Advanced Motion Imaging Conference: Feb. 27-Mar. 1, 2003; pp. 1-4.

Diana C. Chen, "Display Resolution Enhancement with Optical Scanners", Applied Optics, vol. 40, No. 5, Feb. 10, 2001; pp. 636-643.

Brochure entitled "The Use of Dual Graphics Devices on the High-End HP xw9300 Workstation", Hewlett-Packard Development Company, #5983-0684EN, Feb. 2005, 8 pages.

* cited by examiner

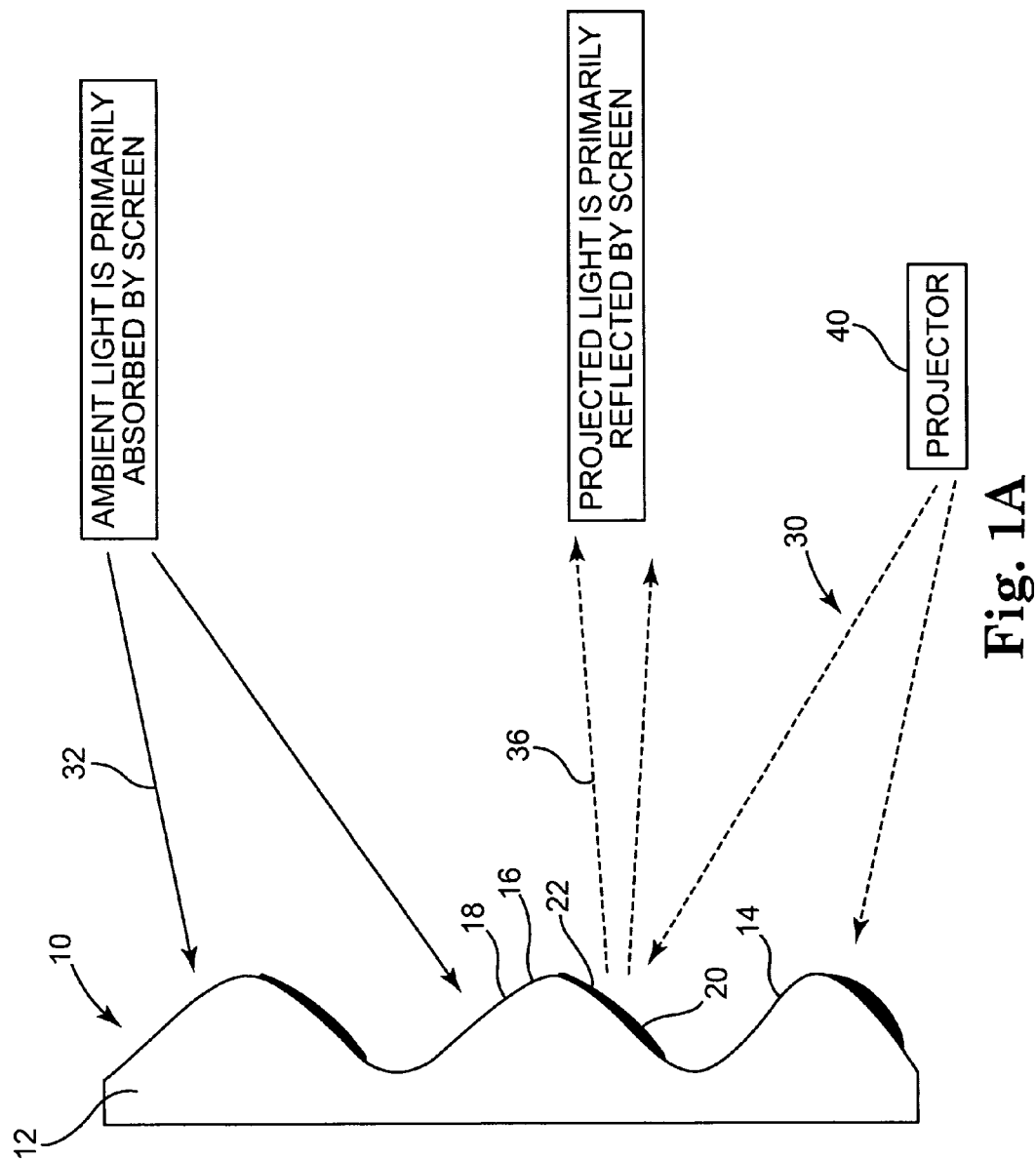

AMBIENT LIGHT ABSORBING SCREEN

CROSS-REFERENCE TO RELATED APPLICATIONS

This application is a continuation-in-part of U.S. application Ser. No. 11/496,774, filed Jul. 31, 2006, and claims the benefit of U.S. Provisional Application No. 60/784,125 filed Mar. 20, 2006; both of which are hereby incorporated by reference herein.

BACKGROUND

The contrast ratio of images projected on front and rear projection screens is severely reduced by the ambient light present in the viewing environment. That is, the darkest level on the screen perceived by a user is affected by how much ambient light is directed to the user from the screen. The brightest level on the screen is determined by the power of the projector. The contrast ratio is the division of the brightest level by the darkest level. For example, in a movie theatre, when the room lights are on, the screen appears white or silver and this is the darkest image level available to the viewer. This effect is why the pre-show ads appear washed out. However, before the movie starts, the lights are accordingly dimmed or turned off and the screen appears dark, thus lowering this darkest level. This dimming of the ambient light is done in order to allow for the majestic beauty of the cinema presentation. However, in some environments, such as in conference rooms, churches, and seminars, there is a need to keep the ambient light on to allow for note taking, participant movement, or to maintain conversational awareness.

Prior approaches to reducing the effects of ambient light have used grey screens to improve the contrast level, but this technique also reduces the overall brightness of the image. Accordingly these grey screens required a more expensive projector that could cast more light to compensate. Another prior technique involved modification of surface geometry of the screen to include a transparent diffusion layer in front of a reflective layer. This approach had the effect of focusing more of the reflected projector light into a limited viewing cone, which is called screen gain. Outside of this viewing cone, the picture quality dropped while inside the viewing cone, the brightness increased with limited effect on improving the contrast ratio as the ambient light also was affected by the screen gain. Some high-gain projection screens utilized an array of lenses over a reflective background to direct projected light back to a viewer. These screens did preferentially reject ambient light with respect to projected light but suffered from a severely limited viewing angle and tended to be relatively expensive.

Regretfully, most people choose to just live with the reduced contrast ratio rather than pay the exponentially increasing cost of more powerful projectors and custom screens. If only there were a better way, audience acceptance of projected images could be improved to better compete with direct view displays.

BRIEF DESCRIPTION OF THE DRAWINGS

FIG. 1A is a diagrammatic side view of an embodiment of a front projection screen with a textured surface to which material has been selectively added to make it reflective.

DETAILED DESCRIPTION

Figure 1B:
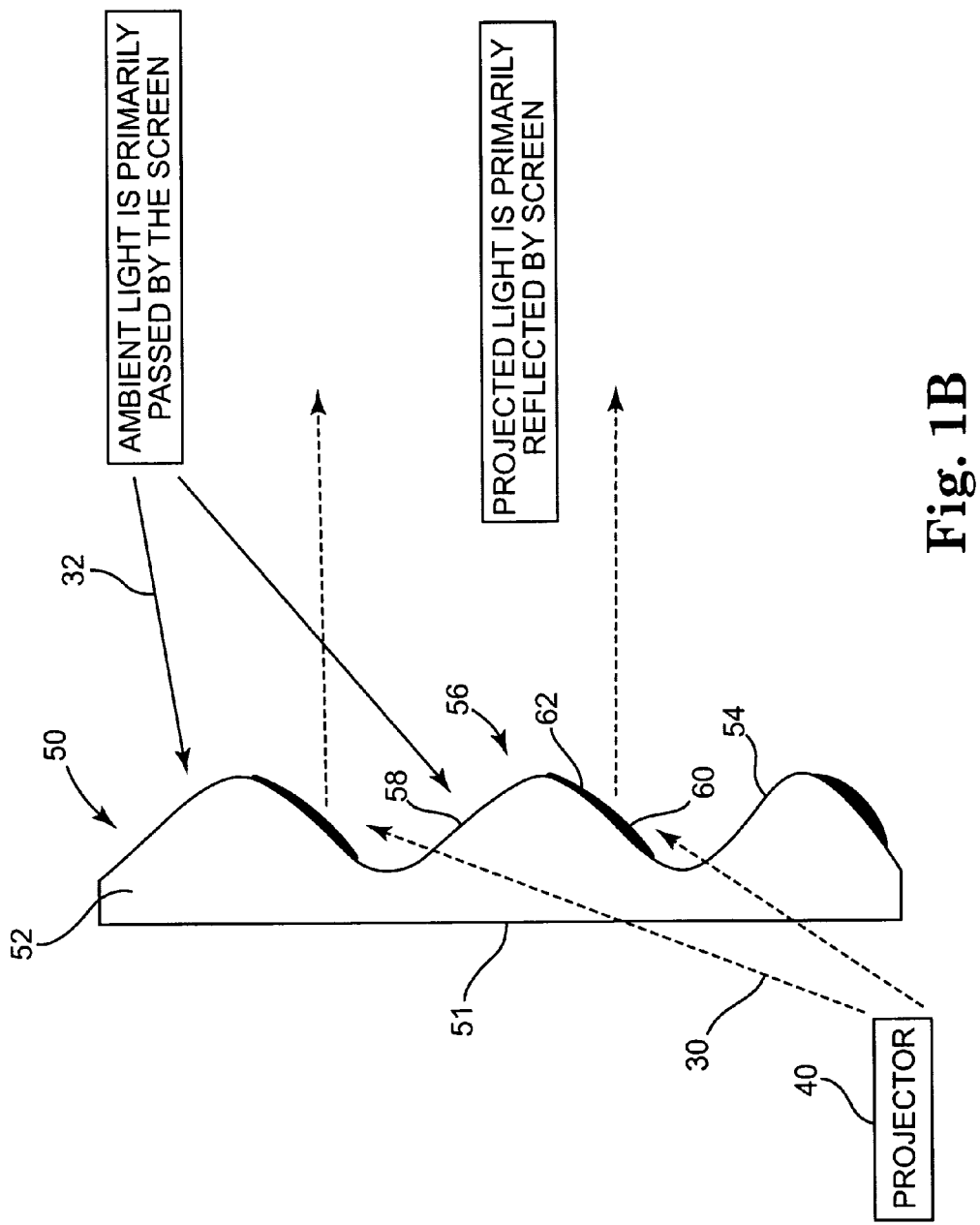
FIG. 1B is a diagrammatic side view of an embodiment of a rear projection screen with a transparent substrate having a textured surface to which material has been selectively added to make it reflective.

In the following detailed description and in the several figures of the drawing, like elements are identified with like reference numerals. The figures are not to scale, and relative feature sizes may be exaggerated for illustrative purposes.

In order to improve the contrast ratio of a projection system, whether it be a front or a rear projection display, this disclosure describes techniques for balancing improvements in projector light reflectivity and ambient light absorption. That is, the portion of the surface features of a screen that faces the projected light to be directed to the viewer, should be reflective while the other portions of the surface should be absorptive. Thus, this disclosure describes screens and techniques for performing "angular absorption" and "angular reflection" versus the conventional technique used in high gain screens, which just restrict "angular reflection."

Accordingly, this disclosure enables both front and rear projection screens which overcome the aforementioned disadvantages and shortcomings of conventional screens. These new screens preferentially absorb ambient light relative to projector light thereby improving perceived image quality through a perceived higher contrast ratio without sacrificing perceived image brightness.

Disclosed are projection screens which are simple, inexpensive to manufacture, and light weight. One embodiment disclosed is directed to a projection screen comprised of a substrate textured with a plurality of generally uniform (at least on average over the surface of the screen) geometric features. In this embodiment, a layer of reflective material is selectively deposited on a portion of the surface of each of the features thereby forming an array of surfaces mostly reflective of light incident at some angles incident to the screen and mostly absorptive of light incident at other angles. The substrate may be made rigid or flexible, flat or curved as a particular application demands. The geometry of the features and the angle at which the material is deposited can be varied according to the particular application to account for such factors as the position of the ambient light sources, the screen orientation, and the projector's relative position to the screen.

One exemplary geometry for the screen's surface features is an array of indentations and protrusions created by embossing, photolithography, chemical or laser etching, or otherwise as will occur to those skilled in the art. The pattern of reflectivity on the surface features forms an array of unique microreflectors. In general, the reflective portion of the features' surfaces is what will be illuminated by the projector. Light from the projector that does not strike a particular portion of the reflective portion of the features' surface is accordingly made light absorbing to prevent ambient light from being directed to viewers.

Accordingly, one exemplary technique starts with an absorptive surface and uses vacuum metal deposition at a glancing angle to the screen's surface to create a reflective surface on a limited portion of each feature's surface. For a given angle of deposition, each feature's geometry shades portions of the feature's surface from deposition, leaving that shaded portion light absorbing. Aluminum or any other material exhibiting a high coefficient of reflectivity may be utilized to achieve reflectivity. A desired pattern of reflectivity may be achieved by varying the angle of vacuum deposition across the height and breadth of the screen. The combined effect of such an array of unique reflective surfaces is to reflect light coming from a projector at one set of angles while absorbing ambient light arriving outside that set of angles thereby improving the perceived contrast ratio.

Embodiments of a projection screen include a substrate textured with a plurality of features. These features may be generally uniform geometrically shaped features or the features may be irregularly shaped or randomly shaped, or consistently shaped but randomly oriented. These features may be projections from the surface or depressions into the surface. A layer of material may be selectively deposited on or selectively removed from a portion of the surface of each of the features to form an array of surfaces. These surfaces are mostly reflective of light incident at some angles and mostly absorptive of light incident at other angles. The substrate itself may be rigid or flexible, flat or curved. The features may be non-continuous over the surface of the substrate, which may reduce or eliminate perceptible lines in the reflected image light.

In other embodiments, the projection screen may provide ambient light reflection or absorption, without enhancement of reflection toward the viewer. That is, the non-absorptive portion may be the substrate's normal surface without additional coatings or depositions. In other embodiments, the projection screen may provide surfaces angled to reflect projector light toward the viewer, without enhancement of absorption or reflection of ambient light to reduce ambient light reflection from the screen to the viewer. However, to maximize the perceived contrast ratio, the portion of the surface features of the screen facing the projected light, which is desired to be reflected to the viewer, are reflective while the other portions, typically facing ambient light from directions other than the projected light, whether from the side or above or below the screen e.g., from windows, skylights, doors, etc., are absorptive.

The geometry of the features and material deposition angle can be varied according to the application particulars such as ambient light, screen, and projector positions. One specific geometry includes an array of indentations and protrusions. The features may be created by embossing or by other techniques. In one embodiment, the pattern of reflectivity on the features may form an array of micro reflectors. In general, the reflective portion of the feature surfaces is what will be illuminated by the projector. If light from the projector will not strike a particular portion of the face, then it is configured to be light absorbing.

For example, in one embodiment, the screen substrate is formed of a light absorbing material and a reflective layer is selectively deposited on portions of the surface features facing the projector.

In another embodiment, the screen substrate is formed of a light-reflective material and a layer of light absorbing material is selectively deposited on portions of the surface features which will be faced toward a source of ambient light. Alternatively stated, a layer of light absorbing material is selectively deposited on those portions of the surface features which do not face the projector. In another embodiment, a layer of light absorbing material is selectively deposited on portions of the surface features of the screen substrate which will be faced toward a source of ambient light, and a reflective layer is selectively deposited on portions of the surface features facing the projector.

In another embodiment, a surface layer, e.g. a light absorbing or a light reflecting layer, is selectively removed to expose light reflecting portions of the substrate or an underlying layer, or to expose light absorbing portions of the substrate or an underlying layer, respectively.

In another embodiment, a substrate formed of a light absorbing material has metal deposited at a glancing angle in a vacuum to create a reflective surface on a limited portion of each feature's surface. For a given angle of deposition, each feature's geometry will shade portions of the feature's surface from deposition, leaving that portion light absorbing. The ratio of reflective area to absorptive area can be about 20/80, about 40/60, about 50/50, about 60/40, or about 80/20 depending on the particular surface geometric features. For instance, when the surface features are randomly spaced but have an average spatial distribution about the same as the average height of the surface features, the ratio of reflective area to absorptive area is about 50/50.

Aluminum or other material exhibiting a high coefficient of reflectivity may be utilized to achieve reflectivity. A desired pattern of reflectivity may be achieved by varying the angle of deposition across the height and breadth of the screen. The effect of such an array of reflective surfaces is to reflect light coming from a projector while absorbing ambient light not coming from the same angle, thus enhancing screen performance.

Details of particular embodiments are further described but are only meant to be exemplary examples of the claimed subject matter. In particular, exemplary embodiments for front view and rear view screens are presented as well as some exemplary methods of fabrication. Other embodiments exist, and the disclosed particular embodiments are only meant to describe and enable those of skill in the art how to practice the claimed invention. Thus the scope of the invention is only limited by the claims and not just these particular embodiments.

Front View Embodiment

FIG. 1A illustrates an embodiment of a projection screen 10 which may be used in a projection system including a projector 40 which directs projector light 30 onto the screen. The screen 10 includes a substrate 12 with a textured surface 14. In one embodiment, the front facing surface of substrate 12 is textured with a plurality of generally uniform features 16 that are generally uniformly spaced apart. The geometry of the features 16 is representative of various possible geometries. The dimensions of the features such as profile, height, and slope of sides, can be varied to affect the surface reflectivity pattern and the ratio of reflective area to absorptive area. Alternative feature geometries include symmetric, asymmetric, or irregularly shaped, as may be utilized in different embodiments according to the requirements of the application. The features may include convex hemispheres or conic sections, concave hemispheres or conic sections, or a combination of convex and concave conic sections.

For instance, the substrate 12 may be fabricated of a dark, light-absorbing material, such as black pigments, particle coated fabrics such as SiC emery paper, thin film coated absorbers with high absorption coefficients such as Silicon Carbide (SiC), Aluminum Nitride (ALN), or Titanium Nitride (TiN), tuned induced absorber stacks (dielectric/metal stacks where the thicknesses are tuned for high absorbance), or metal-ceramic composites with high absorption coefficients.

Each feature 16 has a surface region which faces away from projector 40, e.g. surface region 18, and a surface region which faces the projector, e.g. surface region 20. In one exemplary embodiment, the surface regions which face the projector may be angled from the normal of the surface of the substrate, e.g. in a range of angles from about 5 degrees to about 45 degrees, although this may vary depending on various factors including the placement of the projector relative to the screen and the size of the surface features. The projector-facing regions 20 may be made reflecting with a light reflecting layer or coating 22, which may be, for example, aluminum. Other materials or techniques for achieving light reflectivity in selected regions of the substrate may alternatively be employed. The non-projector-facing surface portions 18 are non-reflective of incident light.

Projector light 30 incident from projector 40 is reflected by the highly reflecting, projector-facing surface regions 20. Ambient light 32 incident on the non-reflecting regions 18, e.g. from above or from a side of the screen, is absorbed and/or weakly reflected by the surface regions 18. Because projected light is reflected more efficiently than ambient light due to the placement of the reflective layer 22, the perceived image contrast is increased as most of the incident light reflected back to a viewer is projected light and the ambient light does not affect the black levels as much as with conventional screens.

Rear View Embodiment

FIG. 1B illustrates one embodiment of a rear projection screen 50. The screen includes a transparent substrate 52. The substrate 52 is fabricated of a translucent or transparent material, such as acrylic or polycarbonate. The front facing surface 54 of the substrate is textured with a plurality of generally uniform features 56 that are generally uniformly spaced apart. The geometry of the features shown is representative of various possible geometries. The dimensions of the features such as profile, height, and slope of sides, can be varied to affect the surface reflectivity pattern. Alternative geometries include symmetric, asymmetric, or irregularly shaped, as may be utilized in different embodiments according to the requirements of the application.

Each feature 56 has a surface region 58 which faces away from the projector, and a surface region 60 which is angled to reflect the light coming from the projector. The angled reflector surfaces are made reflective, e.g. with a light reflecting layer 62, which may be, for example, aluminum or protected silver. The non-projector-facing surface portions are transparent and pass ambient light away from the viewer rather than reflecting it.

Projected light 30 incident on the screen from an image source 40 behind surface 51 of the substrate 52 passes through the substrate, and is reflected by reflective regions 62 toward a viewer. Ambient light 32 incident on surface 54 in the directions illustrated in FIG. 1B is primarily absorbed or reflected back toward the ambient light source, or passed through the transparent portion and not reflected to the viewer. Any surface reflection from ambient light may additionally or alternatively be directed in a direction other than the viewer, e.g. back toward the source of the ambient light.

In one embodiment, the substrate is transparent material and portions of the surface are transformed to a reflecting state. In another embodiment, the substrate surface may be a light reflecting material, and a portion of that surface which does not face the projector 40 is made transparent by etching or other means.

Figure 1C:
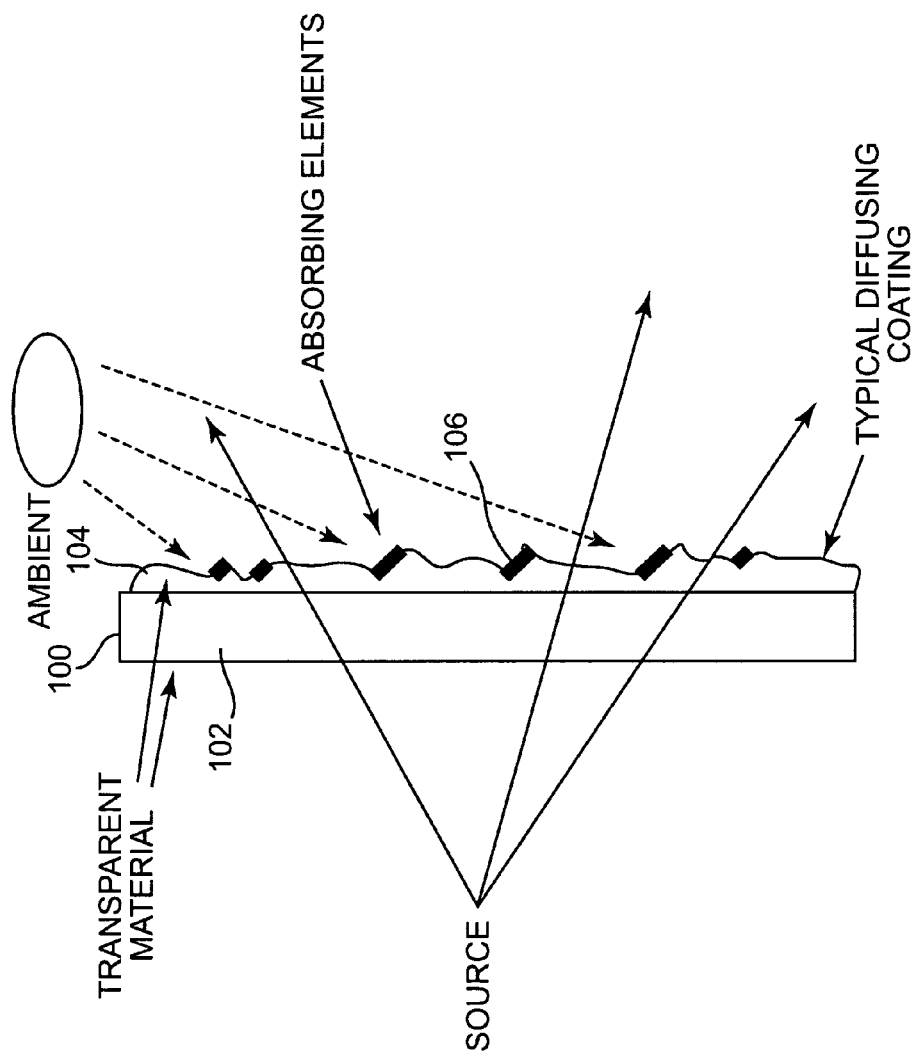
FIG. 1C illustrates another embodiment of a rear projection screen or LCD display.

FIG. 1C illustrates another embodiment of a rear view screen 100. In this embodiment, the screen 100 includes a substrate 102 of a transparent material, having a front surface on which a textured coating 104 is applied. The coating 104 may be a diffusion coating to diffuse light passing through the coating. The coating 104 has a textured surface, on which absorbing elements 106 are applied in directions facing a source of ambient light. Image light from a source behind the screen passes through the screen to the viewer, while ambient light from the ambient light source is substantially absorbed by the absorbing elements 106 rather than being reflected to the viewer. The image source may be, for example, a projector, a light box static display, or an LCD.

Various light absorbing materials such as black pigments or thin film coated absorbers may be utilized as light absorbing surfaces.

The features may be formed in the substrate by embossing. Other techniques for forming features in a substrate may alternatively be employed. Alternative methods of forming features in a substrate include hot stamp rolling and micro-machining.

Alternative embodiments of a front or rear view screen include, for example, dark glass beads on a dark substrate, irregularly shaped particles on a substrate surface, woven materials having an appropriate weave, a substrate with micro posts, and cloth-like materials with an inherent surface structure. In the embodiment in which a screen is fabricated from a woven material, the material may or may not have extra features or particles in addition to the woven material. The woven material may have a three-dimensional surface profile. Added features such as particles applied to the surface of the woven material may tend to enhance the randomness of the response. The thread of woven material may be coated with reflective or absorptive material with the weave of the material to be considered the surface "features." Further exemplary materials from which the screen may be fabricated include Polyvinyl Chloride (PVC), Polypropylene (PP) and Polyethylene Terephthalate (PET) at exemplary thicknesses between about 3 mils to 12 mils. For a flexible screen, further exemplary materials for the substrate may include a 3 ply material with PVC/fabric/PVC; an exemplary fabric is fiberglass cloth. An exemplary thickness range for the 3-ply material is 8 mils to 30 mils, or between 10 mils and 15 mils.

Exemplary Methods of Fabrication

One method for fabricating a front or rear view screen involves providing a substrate with a textured surface, and coating the surface by deposition at low angles. The substrate may have a high reflectance, such as a textured metallic or white surface. In this case the low angle deposition may provide a low reflectance such as a dark paint or thin-film absorber. In an alternative embodiment, the substrate may be a good light absorber, and the low angle deposition may be a high reflectance deposition such as white paint or metallic coating. One embodiment of a screen may be fabricated by evaporating aluminum at low angles onto textured surface substrates. Alternatively, low-cost embossed substrates may be employed as the textured surface substrate with periodic, random, or pseudo random structures.

Various other embodiments of initial textured substrates include micro-machined or micro-embossed substrates, embossed plastics, papers or cloth surfaces or glass-beaded surfaces. These surfaces may also include periodic, random, or pseudo random structures. Various embodiments of low angle depositions include high vacuum evaporation and vapor deposition. The particular angle or angles of the deposition may depend on the application and the geometry of the substrate surface. An exemplary range of low angle deposition angles include the range of from 5 degrees to 45 degrees, as measured from the surface of the substrate. For deposition of reflecting materials, the reflective surface angle may be between an angle of incidence of projector light and an angle of sight to the viewer. The angle of deposition may also be larger than 45 degrees for some embodiments, e.g. 90 degrees, depending on the fabrication technique and shape of the surface features, e.g. including flat tops of features.

In particular embodiments, the feature size may be large enough to avoid diffraction and interference effects, and small enough to avoid pixilation or sparkle to the human eye. One exemplary range is from around 75 microns to 150 microns in width, and of comparable height depending on the viewing distance, projector position, ambient position, and desired ambient rejection properties. Another exemplary range is from 4 microns to 20 microns. Yet another exemplary feature size range is from around 75 microns to 500 microns or even larger. Other embodiments may use features of larger scale, e.g. when the viewing distance from the screen is relatively large.

Figure 2:
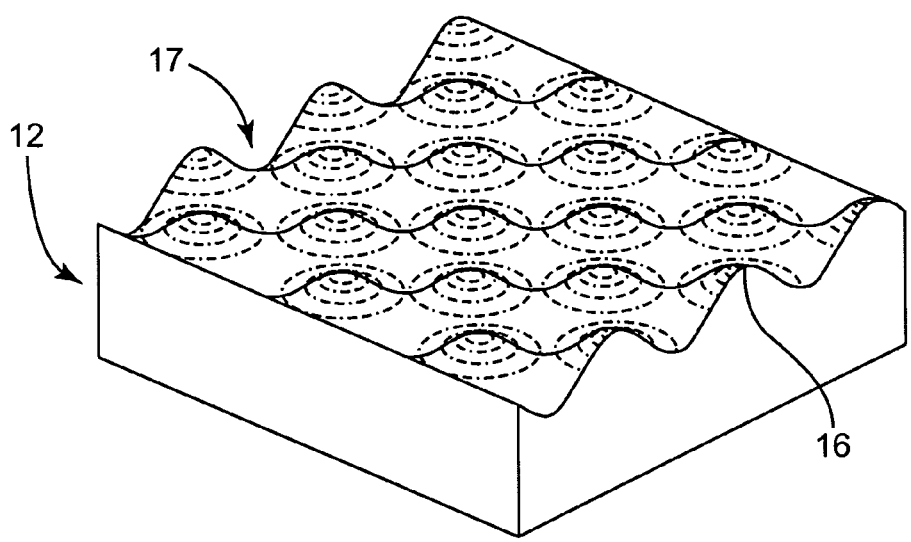
FIG. 2 is an isometric view of an embodiment of a textured substrate.

FIG. 2 is an isometric view of an embodiment of a textured substrate 12 for use as a projection screen. The front facing surface of substrate 12 is textured with a plurality of generally uniform features 16 that are generally uniformly spaced apart. The features 16 include substantially convex hemispherical surface portions (indicated by hidden lines), separated by pits or recesses 17. In one embodiment, substrate 12 is formed of a light absorbing material, and metal is deposited at a glancing angle to substrate 12 in a vacuum to create a reflective surface on a limited portion of the surface of each feature 16. For a given angle of deposition, the geometry of each feature 16 shades portions of the feature's surface from deposition, leaving that portion light absorbing.

Figure 3:
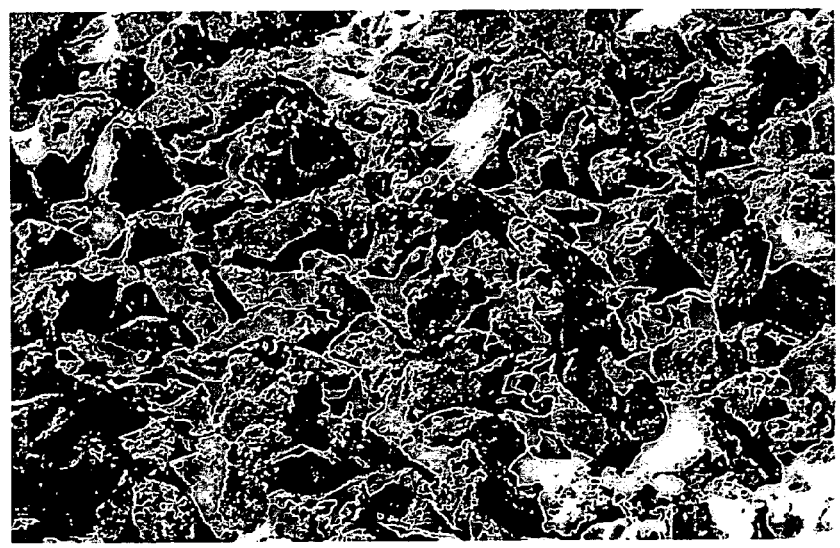
FIG. 3 is a photographic image of an embodiment of a substrate on which a low angle deposition has been performed.

FIG. 3 is a depiction from a scanning electron microscope image of an embodiment of a substrate imbedded with black irregularly shaped particles on which aluminum had been deposited at a low glancing angle from the surface horizon. The substrate in this embodiment has a rough, randomly textured surface, i.e. a rough surface. The dark regions are the uncoated portions of the substrate, and the lighter regions are the coated portions (i.e. coated with aluminum) of the substrate.

Figure 4:
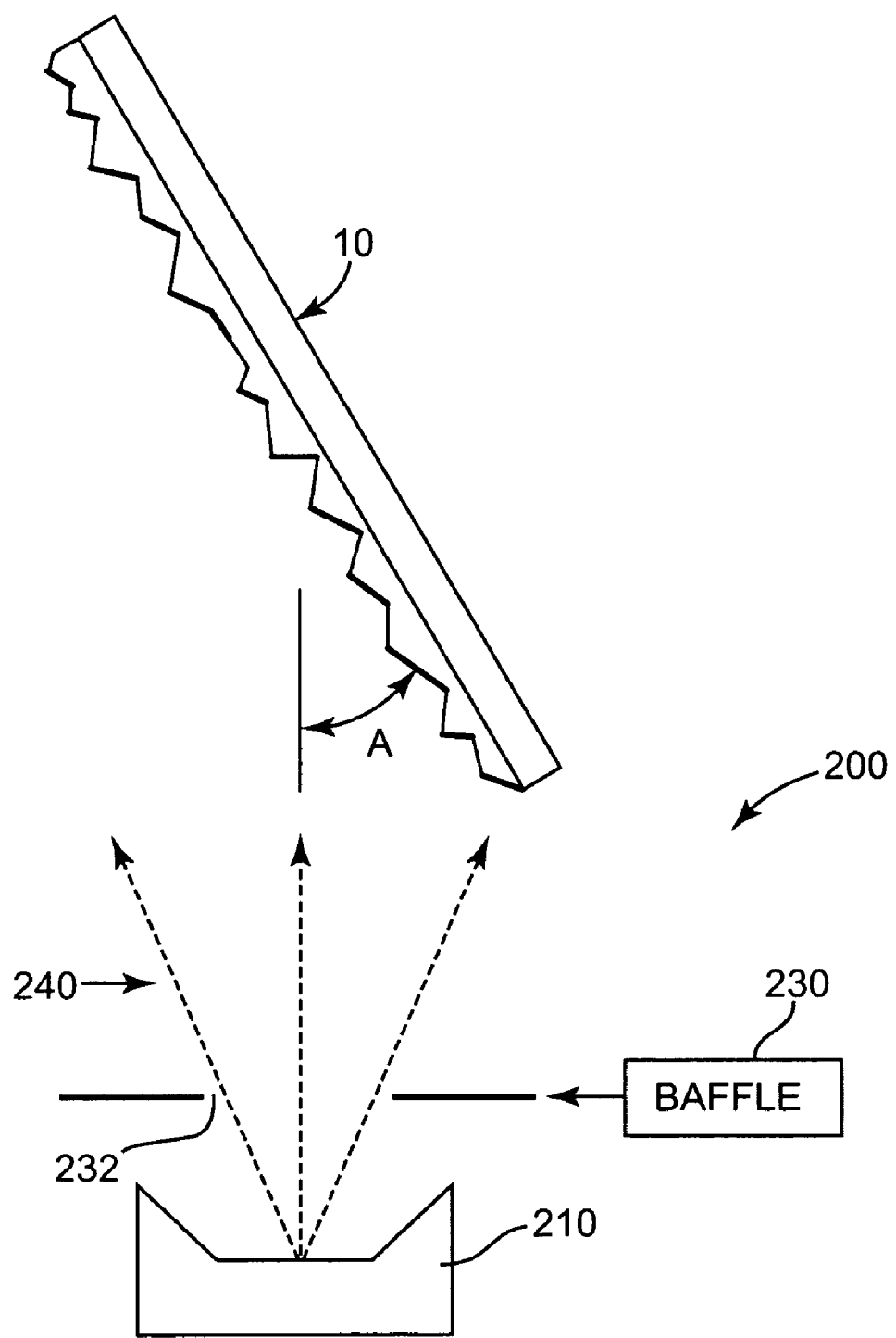
FIG. 4 schematically depicts an embodiment of a deposition system for low angle deposition of a material onto a substrate.

FIG. 4 illustrates an exemplary vapor deposition system 200 for depositing a layer of material at low angles onto a textured substrate 10 at a glancing angle, e.g. less than normal to the general plane of the substrate 10, or at a low angle typically similar to, but not limited to, the angle of incidence of projector light onto the substrate surface. The system includes a source of the deposition material 210. A stream of deposition material particles is directed through an opening 232 in a baffle 230 toward the surface of the substrate, which is supported so that the particles generally have a low angle A of incidence on the substrate, e.g. between 5 degrees and 45 degrees. The baffle opening in one embodiment serves to provide a limited angular range stream 240 of particles to make it somewhat collimated. It can be seen that the baffle 230 may determine the actual range of angles of deposition on the substrate and hence which portions of each feature's surface is coated with the reflective material. Some portions of a feature's surface may be shaded from deposition by other features.

Figure 5:
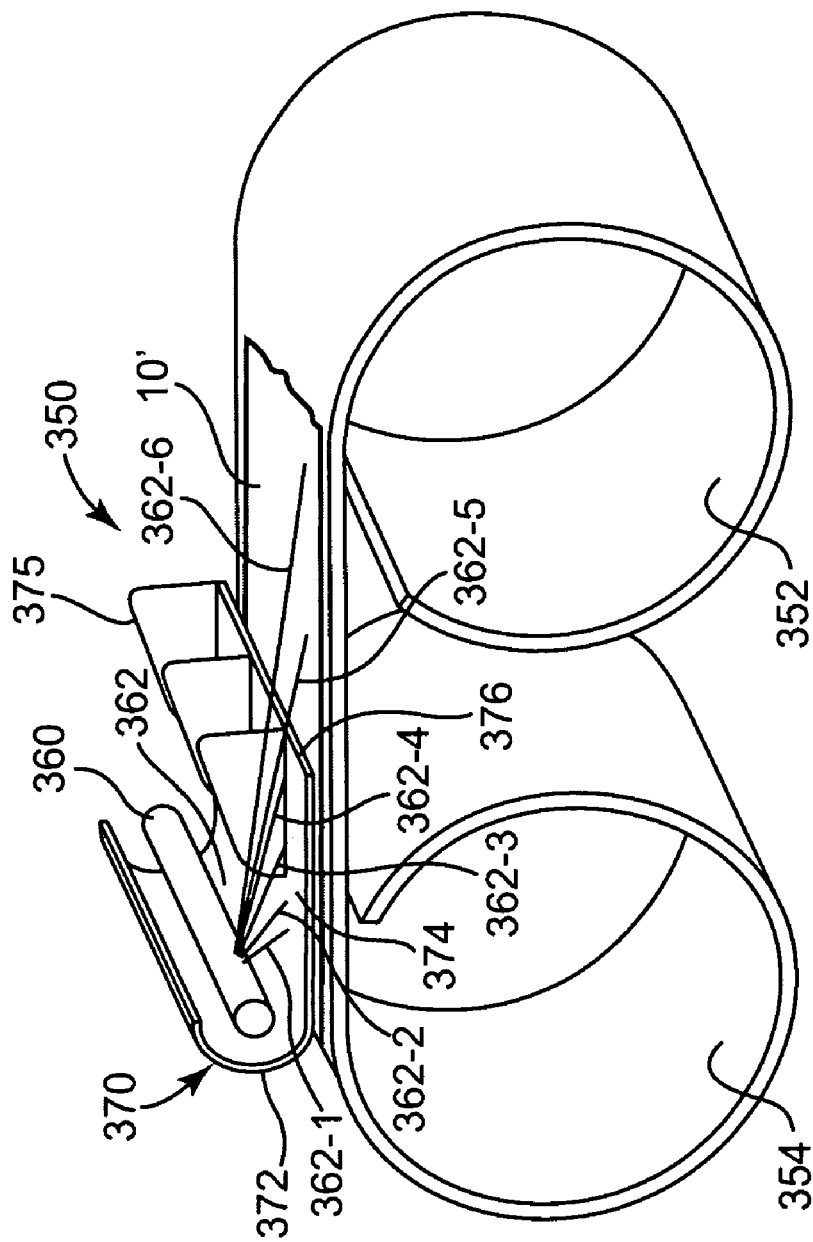
FIGS. 5 and 6 schematically depict another embodiment of a deposition system for low angle deposition of a material onto a substrate.
Figure 6:
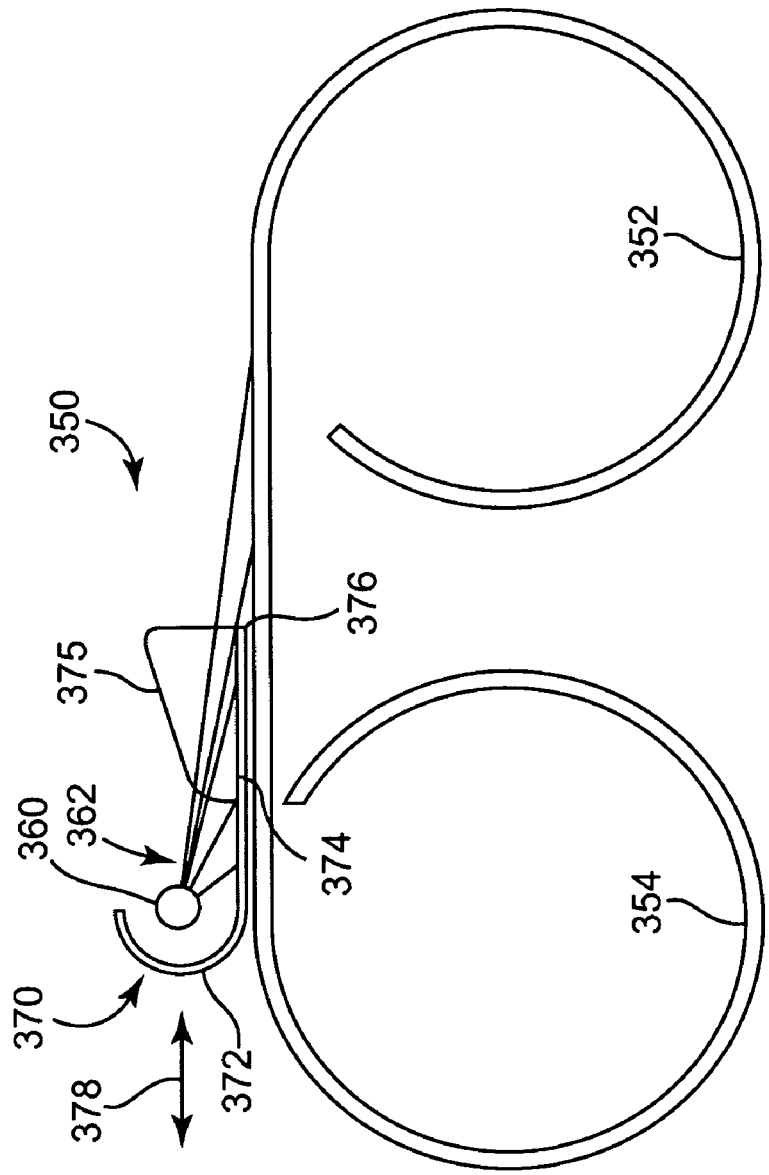

FIGS. 5 and 6 depict diagrammatically another embodiment of a method and system 350 for deposition of a layer of material at low angles onto a textured substrate 10'. The substrate 10' in this embodiment is a flexible substrate formed on a roll 352. An end of the substrate roll is reeved about a take-up roller 354, allowing the surface of the substrate 10' to be advanced through the deposition material stream. After the coating layer has been applied through the deposition process, the substrate roll may be cut into lengths/widths of suitable size for a given screen application.

The system 350 includes a source 360 of the deposition material, which may be in the form of a rod. If the layer to be deposited is an aluminum layer, for example, then the source 360 may be a rod of aluminum.

In this particular embodiment, the system 350 includes a baffle system 370 that moves dynamically relative to the source material target 360. One embodiment of the baffle system 370 includes a curved baffle portion 372 and a generally planar baffle portion 374, which terminates in an edge 376. Upright baffle fin portions 375 extend upwardly from the planar portion 374 and provide for control over angles of deposition incidence onto the substrate in an azimuth direction. By placing the fins closer together, the azimuth direction is more tightly controlled. The streams of particles, at an angle close to the normal direction, are passed between the fin portions and streams of particles impinging on the fin portions are blocked.

The length of the planar portion 374 may be selected to position the baffle edge 376 to control the deposition elevation angle range. The stream of particles is depicted in FIG. 6 as 362 and includes particle streams 362-1 . . . 362-6 of varying angles of incidence in relation to the plane of the substrate undergoing the deposition process. The streams range from shallow (stream 362-6) to more direct 362-1. Depending on the length of the planar portion 374 between the source 360 and the edge 376, one or more of the particle streams may be blocked by the baffle. In the example of FIG. 6, the baffle is designed and positioned to allow relatively shallow angles of stream (362-5 and 362-6) to intercept the substrate 10' with the baffle blocking streams 362-1 . . . 362-4.

The baffle 370 may be positioned on a shuttle apparatus to move the baffle along axis 378 to vary the position in relation to a stationary deposition source 360. Thus, this technique allows for varying the angle of deposition incidence.

The source material on the target 360 is sputtered or evaporated in vacuum in a fashion well known in the vacuum deposition, vapor deposition or sputtering art. The source material stream 362 travels linearly until it is obstructed by the baffle structures 375 and 376 or it strikes the features on the substrate at a glancing angle. It can be seen that no source material will strike the substrate features at an angle greater than the path from the source target and the edge of the baffle 376. The geometry and arrangement of the vertical fins will govern the degree of source material deposition on different portions of the feature surfaces. By varying the baffle position relative to the source material target while the substrate is rolled past the baffle, the deposition angle can be varied from the bottom to the top of the screen in a way that corresponds with the angle or angles that light from the projector impinges upon the screen.

Alternative methods of transforming selected regions of the feature surfaces from absorbing to reflecting include the following: All features of the substrate may be fully coated with either a light absorbing or a light reflecting photosensitive material, such as a silver halide emulsion, for example. Then the screen surface is exposed to either a point radiation source, i.e. radial exposure, a line radiation source, i.e. linear exposure, or a scanning beam of radiation that will permanently transform the photosensitive material to the opposite state. Alternatively the coating material could be thermosensitive. An additional method to transform surface features from light absorbing to light reflecting is through the use of jetted materials at a glancing angle. This may be done in a scanning fashion. An additional method is to mechanically transform the surfaces of the features from light absorbing to light reflecting. These mechanical methods include abrasion, and cutting. Additional methods of surface alteration include chemical such as etching, electro chemical, photochemical, or electrostatic. Another method is to coat the substrate with a light-sensitive absorbing material, and expose the light-sensitive absorbing material at a glancing angle to cause exposed faces to become reflective to create the set of reflective areas on the exposed faces. Alternatively, the substrate may be coated with a light-sensitive reflecting material, and the light-sensitive reflecting material exposed at a glancing angle to cause exposed faces to darken to create the set of absorptive areas on the exposed faces. Another method includes depositing a light-reflecting material on certain faces of a light-absorbing substrate with the certain faces directed to a first set of angles facing a source of image light using either an electro-photographic process, an electrochemical process, or combination of both to create a set of reflective areas. Alternatively, a method may include depositing a light-absorbing material on certain faces of a light-reflecting substrate with the certain faces directed to other than the first set of angles using either an electro-photographic process, an electrochemical process, or combination of both to create the set of absorptive areas.

The screen may be used for non-visible projector light and/or non-visible ambient light, rather than or in addition to visible light. For example, some applications may be designed for enhancement of screen contrast for ultraviolet light or infrared light.

Figure 7:
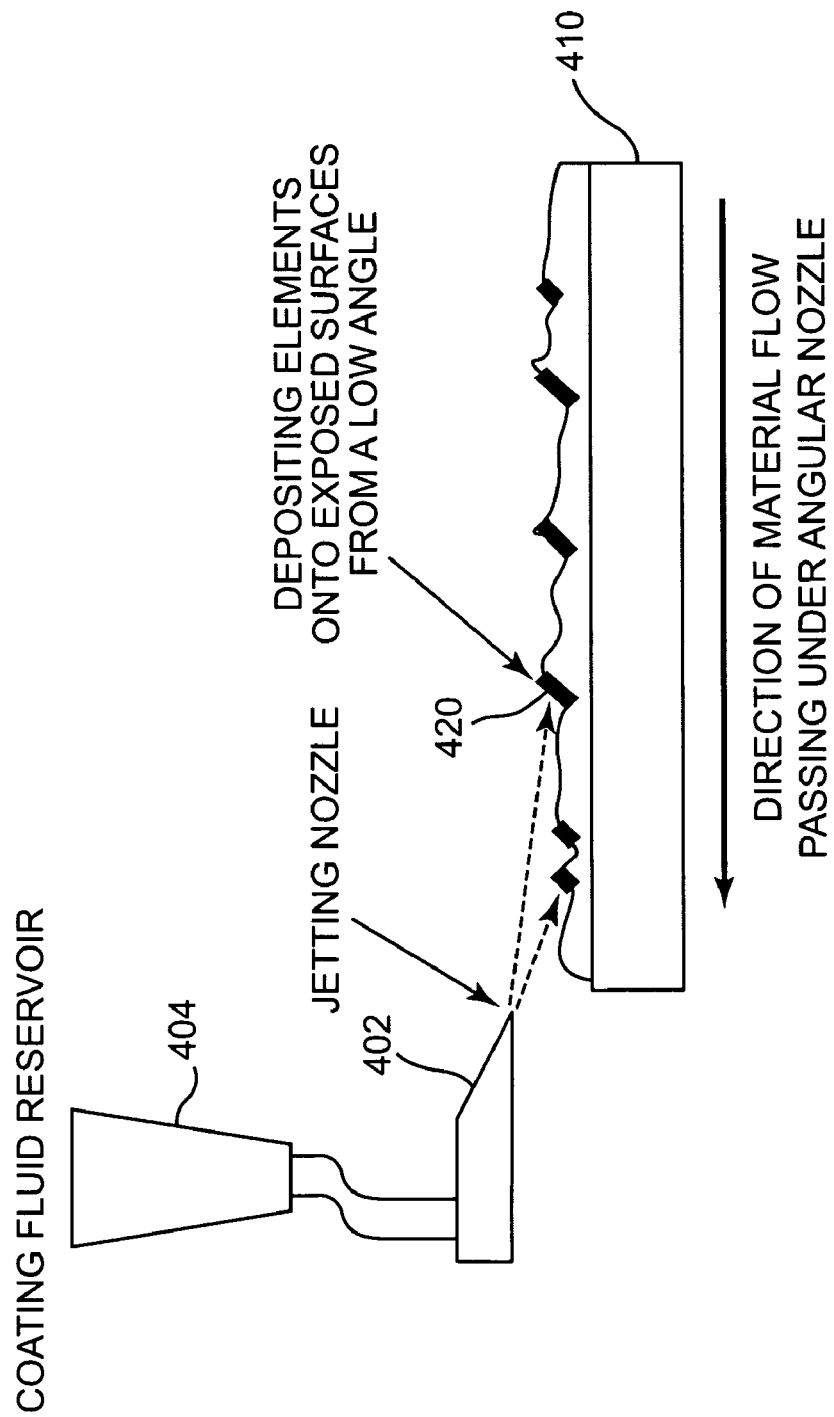
FIG. 7 diagrammatically depicts a method of jetting absorptive or reflective elements onto exposed surfaces of a featured substrate.

FIG. 7 diagrammatically depicts a method of jetting absorptive or reflective elements 420 onto exposed surfaces of a featured substrate 410. A jetting nozzle 402 is connected to a coating reservoir 404, and is positioned to jet the coating fluid or particles onto the substrate at a low angle. The jetting nozzle may be an angular nozzle for emitting the fluid or particles at the low angle. The jetting nozzle may operate under fluid pressure, by way of example only. Other embodiments may use other mechanisms for ejecting the coating material. The substrate 410 may be moved past the jetting nozzle in the direction indicated in FIG. 7, and may be in sheet or roll form.

Figure 8:
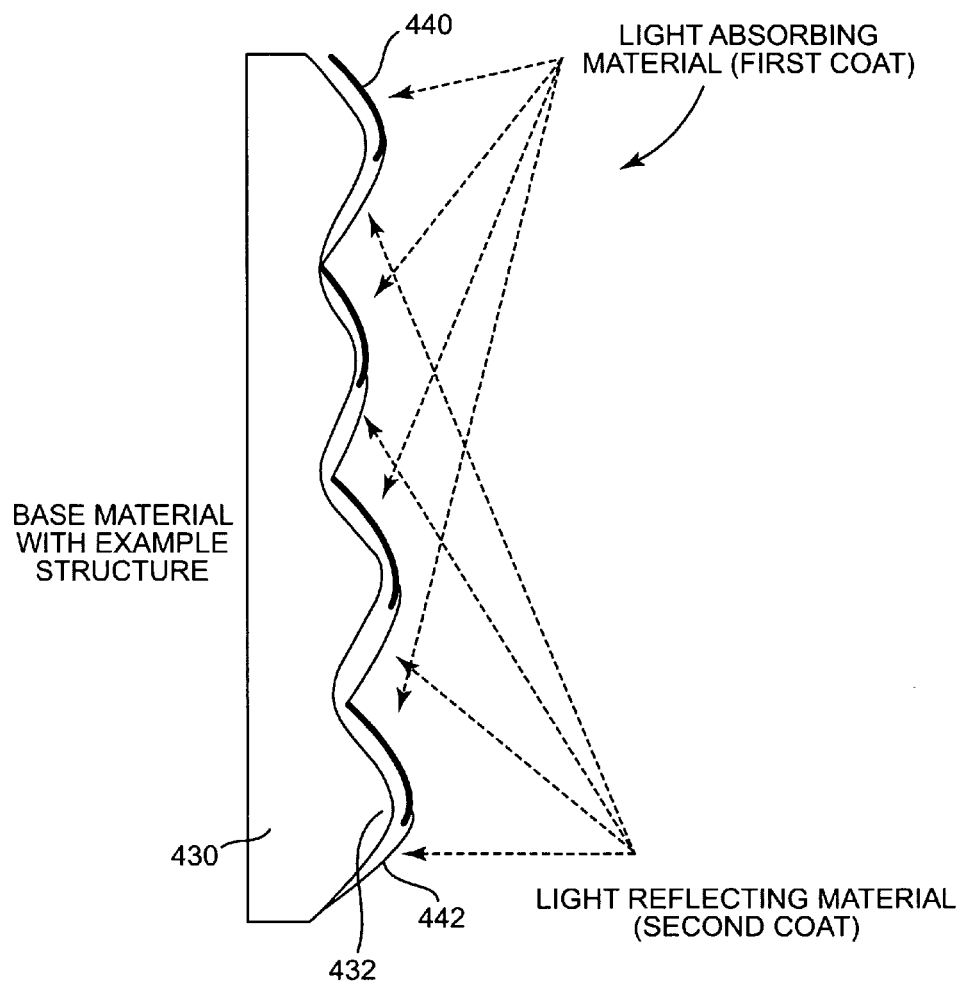
FIG. 8 illustrates another embodiment of a screen substrate, in which a first layer of light absorbing material is selectively deposited on portions of the surface features of the screen substrate, which will be faced toward a source of ambient light, and a second layer of reflective material is selectively deposited on portions of the surface features facing the projector.

FIG. 8 illustrates another embodiment of a screen substrate 430, in which a first layer 440 of light absorbing material is selectively deposited on portions of the surface features 432 of the screen substrate which will be faced toward a source of ambient light, and a second layer 442 of reflective material is selectively deposited on portions of the surface features facing the projector. The order of placement of the first and second layers may be reversed, so that the reflective material is deposited first and the light absorbing material is next deposited.

Ambient Light Rejecting Projection Screen Embodiment

Figure 9:
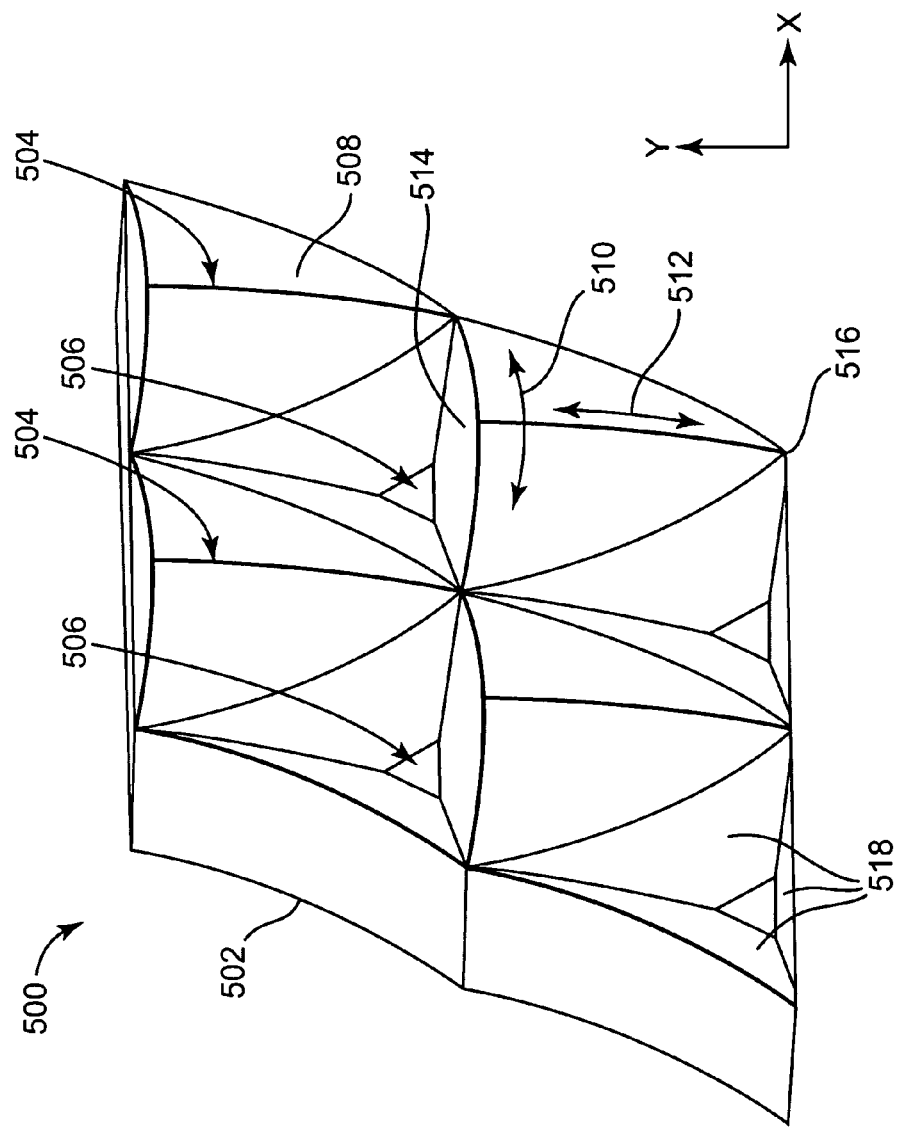
FIG. 9 is a diagram illustrating a front view of a portion of an ambient light rejecting projection screen according to one embodiment of the present invention.
Figure 10:
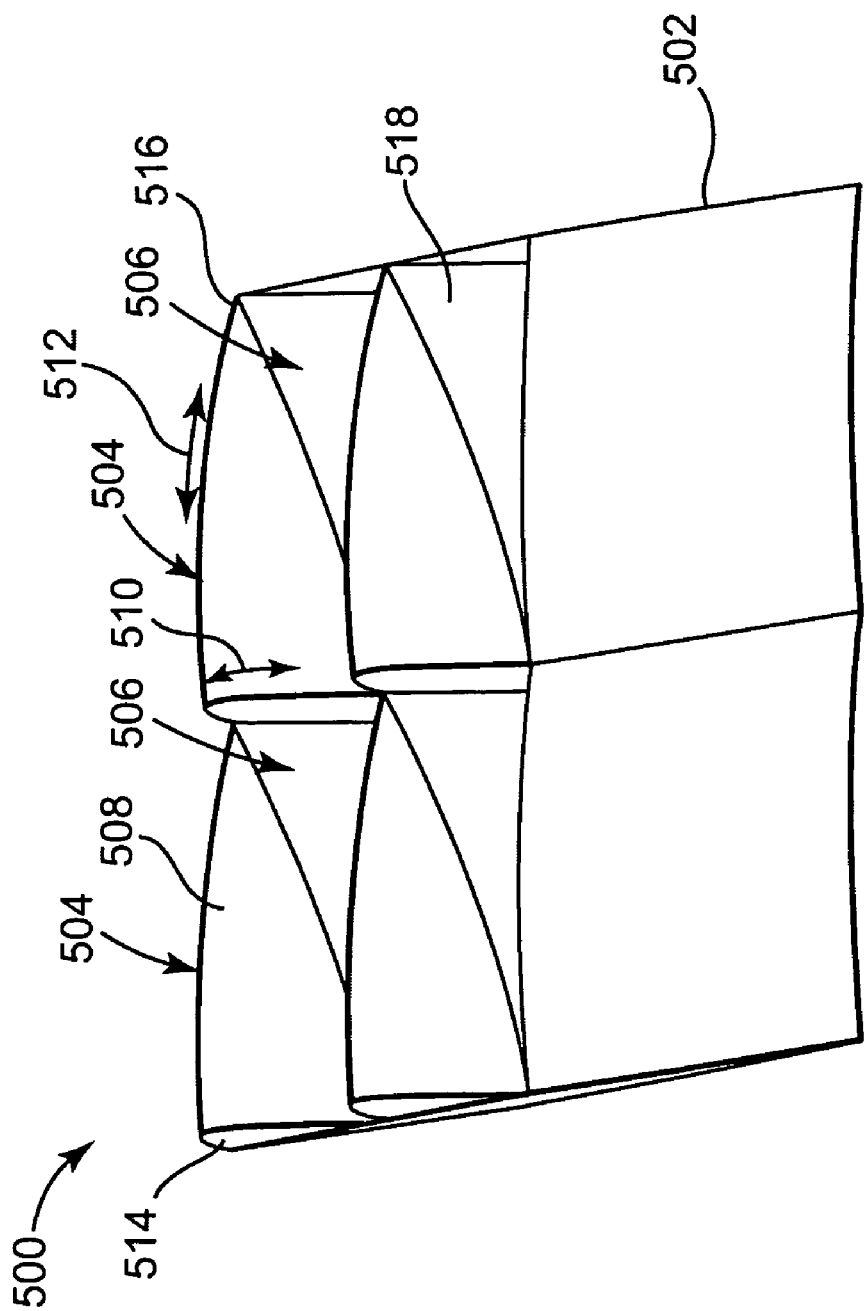
FIG. 10 is a diagram illustrating a side view of the projection screen portion shown in FIG. 9 according to one embodiment of the present invention.

FIG. 9 is a diagram illustrating a front view of a portion of an ambient light rejecting projection screen 500 according to one embodiment of the present invention. FIG. 10 is a diagram illustrating a side view of the projection screen portion 500 shown in FIG. 9 according to one embodiment of the present invention. Screen portion 500 is configured to receive projector light from a projector facing direction, and reflect the received projector light toward a viewer, while absorbing or directing ambient light incident on the screen away from the viewer. Screen portion 500 includes substrate 502, which includes a plurality of features 504 and a plurality of recesses or cavities 506. Each of the features 504 includes a reflective surface 508 oriented to a projector facing direction. Each of the reflective surfaces 508 is curved in a first direction (i.e. along the horizontal X-axis), as indicated at 510, to provide a desired horizontal viewing angle. Each of the reflective surfaces 508 is curved in a second direction (i.e., along the vertical Y-axis), as indicated at 512, to provide a desired vertical viewing angle. In the embodiment shown in FIG. 9, each of the features 504 is an arched or bowed conic section having a base 514 and the reflective surface 508. The reflective surface 508 extends from the base 514 to a tip 516 of the conic section. In one embodiment, the base 514 of each of the features 504 is an absorptive surface that is oriented substantially perpendicular to a plane of the projection screen (i.e., the plane of the paper in FIG. 9).

In the illustrated embodiment, the plurality of features 504 and the plurality of recesses 506 are uniformly positioned in two dimensions across a surface of the substrate 502. The plurality of features 504 are non-continuous across the surface of the substrate 502, and are separated from each other by the plurality of recesses 506. In one embodiment, the recesses 506 are absorptive recesses, and each of the recesses 506 includes a plurality of light absorbing surfaces 518. In the embodiment shown in FIGS. 9 and 10, each of the recesses 506 includes three light absorbing surfaces 518, and each of the absorptive recesses 506 is generally pyramidal in shape. In the illustrated embodiment, each of the light absorbing surfaces 518 is flat or substantially flat, and generally triangular in shape. In the illustrated embodiment, the features 504 and the recesses 506 are each positioned on a hexagonal grid to minimize moiré effects.

In one embodiment, substrate 502 is a light absorbing plastic film (e.g., Polyvinyl Chloride (PVC), Polypropylene (PP), or Polyethylene Terephthalate (PET)) that has been embossed to form the features 504 and recesses 506, and the reflective surfaces 508 are formed by depositing light-reflective material (e.g., aluminum) at a glancing angle onto the substrate 502. For the embodiment shown in FIG. 9, the light-reflective material is deposited at a glancing angle in the Y-direction. The recesses 506 are in the shadow of the features 504 during the deposition, so reflective material is not deposited in the recesses 506 or on the base 514 of the features 504, and the recesses 506 and bases 514 remain light-absorbing.

In particular embodiments, the size of features 504 is large enough to avoid diffraction and interference effects, and small enough to avoid pixilation or sparkle to the human eye. The features 504 are small enough in one embodiment so that the projection screen does not appear grainy. An appropriate size for features 504 may vary depending on the particular projector system implementation, including screen size, viewing distance, projector position, and ambient position. In one embodiment, the features 504 have an average feature length and width in a range from about 75 microns to 500 microns. Yet another exemplary feature size range is from around 25 microns to 500 microns or even larger. Feature sizes of 200-300 microns or less appear to be acceptable in a conference room setting. Larger features may be acceptable for larger screens.

Figure 11:
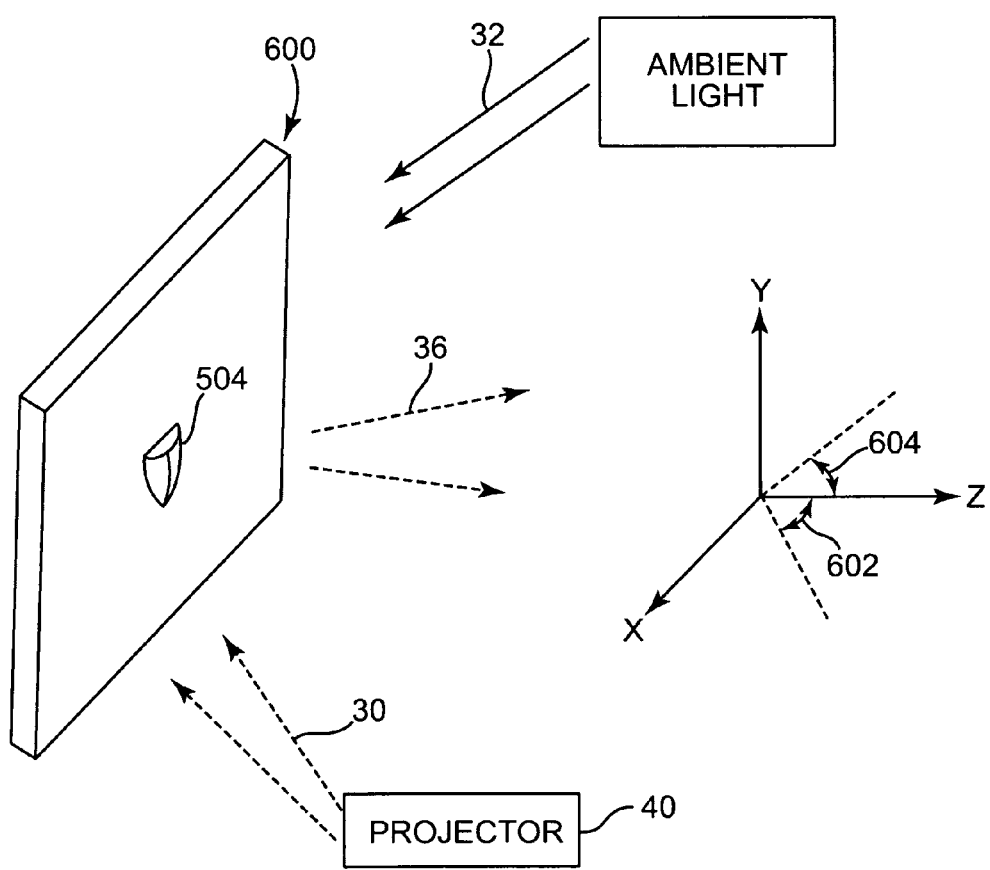
FIG. 11 is a diagram illustrating a projection screen with substrate features like those shown in FIGS. 9 and 10 according to one embodiment of the present invention.

FIG. 11 is a diagram illustrating a projection screen 600 with substrate features like those shown in FIGS. 9 and 10 according to one embodiment of the present invention. Projection screen 600 is configured to be used in a projection system including a projector 40 that directs projector light 30 onto the screen 600. In one embodiment, projection screen 600 includes the same pattern of features 504 and recesses 506 shown in FIGS. 9 and 10 across the entire front surface of the projection screen 600. One feature 504 is shown enlarged in FIG. 11 to illustrate the orientation of the surface pattern according to one embodiment.

Projector light 30 incident from projector 40 is reflected by the curved reflective surfaces 508 (FIGS. 9 and 10) of the features 504. The reflected light 36 is directed outward from the screen 600 toward a viewer. Ambient light 32 incident on the absorptive recesses 506 or the absorptive base 514 of the features 504 (e.g., ambient light from above or from a side of the screen 600), is absorbed and/or weakly reflected by the absorptive recesses 506 or the absorptive bases 514. Because projected light is reflected more efficiently than ambient light due to the design of the features 504 and recesses 506, the perceived image contrast is increased, as most of the incident light reflected back to a viewer is projected light, and the ambient light does not affect the black levels as much as with conventional screens.

Screen 600 has an associated horizontal viewing angle 602 (in the X-Z plane) and vertical viewing angle 604 (in the Y-Z plane). A viewing angle according to one embodiment of the present invention is defined as the angle at which brightness or contrast drops below fifty percent of the maximum. The viewing angles 602 and 604 define a viewing cone of screen 600. By making appropriate geometrical choices of the surfaces of the features 504 and recesses 506 in both the horizontal axis (i.e., X-axis) and the vertical axis (i.e., Y-axis), one can independently tune the horizontal and vertical viewing angles 602 and 604, as well as the overall brightness of the screen 600. In one embodiment, the features 504 and recesses 506 of projection screen 600 are designed to maximize the contrast ratio of ambient to projected light reflected from the surface. By tuning the viewing cone, one can manage where light is going, allowing for a brighter screen. By controlling the geometry of the surface of the screen 600, it is possible to ensure a reliably bright screen with known properties.

As shown in FIGS. 9 and 10, the light reflecting surfaces 508 of features 504 are curved in both the horizontal axis (i.e., X-axis), as indicated by arrow 510, and the vertical axis (i.e., Y-axis), as indicated by arrow 512. The degree of curvature in the horizontal and vertical axes is determined by the shape of the desired viewing cone. The slope of surface 508 in the vertical axis is determined by projector 40 position relative to the screen 600. The light absorbing surfaces 518 that define the recesses 506 are generally steep (e.g., close to perpendicular to the plane of the screen 600) in one embodiment to prevent light that is reflected from these surfaces from reaching the viewer.

The shape of the features 504 will vary depending upon the particular application for which the screen 600 is designed. For example, for a screen 600 that is designed for a short throw projector (e.g., a projector that is positioned about one to two feet below the bottom of the screen 600, and about twelve to fourteen inches back away from the screen), the reflective surfaces 508 will be oriented downward to face the projector, and the slope of surface 508 in the vertical axis will be relatively large. For a screen 600 that is designed for a table-top projector (e.g., a projector that is positioned on a table about even with the bottom of the screen 600, and about six to ten feet back away from the screen), the reflective surfaces 508 will be oriented downward to face the projector, and the slope of surface 508 in the vertical axis will be relatively small (i.e., the surface 508 will be flatter in the vertical axis than a screen designed for a short throw projector). For a screen 600 that is designed for a ceiling-mount projector (e.g., a projector that is positioned above the screen 600, and about six to eight feet back away from the screen), the reflective surfaces 508 will be oriented upward to face the projector, and the slope of surface 508 in the vertical axis will be relatively small (i.e., the surface 508 will be flatter in the vertical axis than a screen designed for a short throw projector).

The projection screen 600 according to one embodiment provides excellent ambient light rejection, a wide viewing angle, and is relatively inexpensive to manufacture. In one form of the invention, unlike some prior ambient light rejection screens, projection screen 600 is compatible with short throw projectors. Embodiments of the present invention provide improvements over prior projection screens. One example of a prior approach is a projection screen that includes a striated surface geometry that reflects light on the lower face of the striation, and absorbs light falling on the upper side of the striation. This striated surface geometry results in a very limited viewing cone, as each of the faces is flat, unlike the curved reflective surfaces used in embodiments of the present invention. In addition, no attempt is made to manage light in the horizontal axis using this prior design. A second example of a prior approach is a projection screen that has a surface geometry made up of an array of individually oriented mirrors. This prior approach suffers from inflexibility of configuration, and these screens are difficult to manufacture. A third example of a prior approach is a projection screen that utilizes an array of lenses over a reflective background to direct projected light back to a viewer. These screens have a severely limited viewing cone, tend to be relatively expensive, and are unsuitable for short-throw projection systems.

Figure 12:
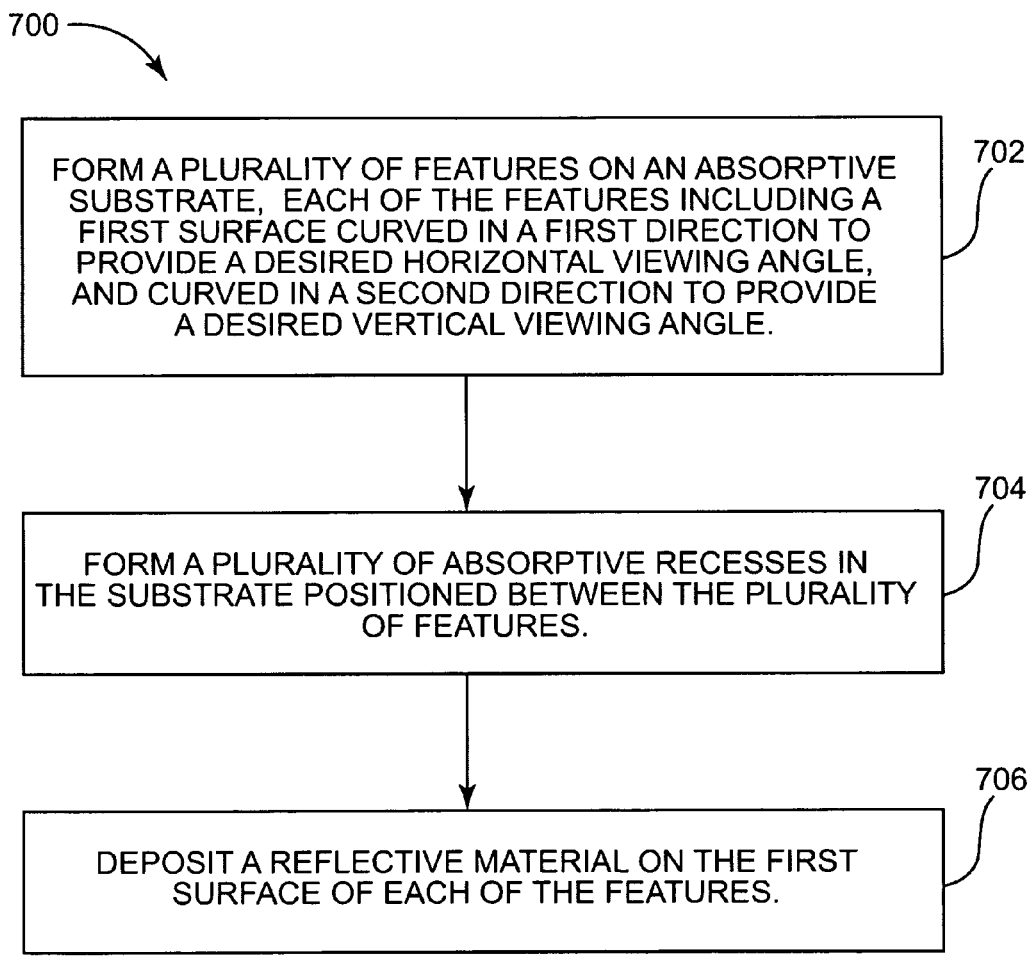
FIG. 12 is a flow diagram illustrating a method of creating a projection screen according to one embodiment of the present invention.

FIG. 12 is a flow diagram illustrating a method 700 of creating a projection screen 600 according to one embodiment of the present invention. At 702, a plurality of features 504 is formed on an absorptive substrate 502 (FIGS. 9 and 10). In one embodiment, each of the features 504 formed at 702 includes a first surface 508 curved in a first direction 510 to provide a desired horizontal viewing angle 602, and curved in a second direction 512 to provide a desired vertical viewing angle 604. At 704, a plurality of absorptive recesses 506 are formed in the substrate 502 and positioned between the plurality of features 504. At 706, a reflective material is deposited on the first surface 508 of each of the features 504.

Figure 13:
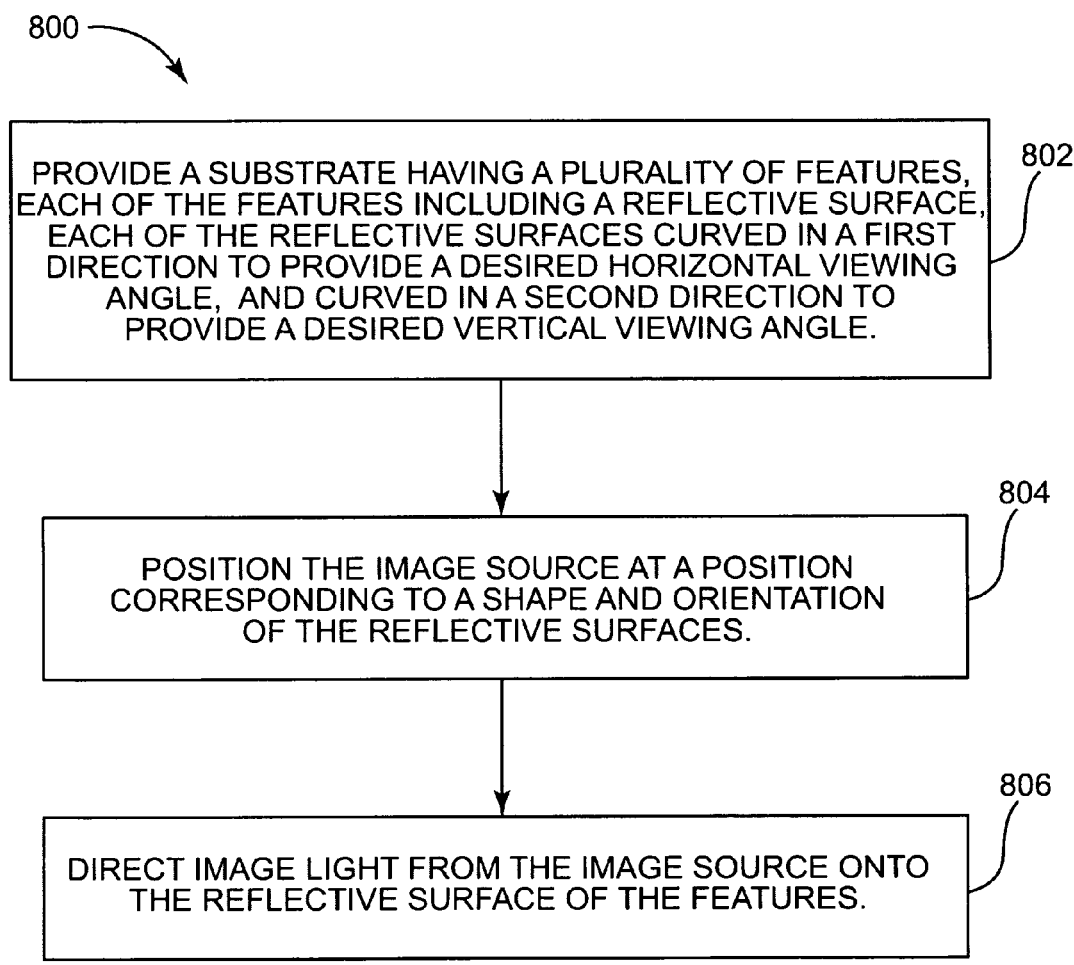
FIG. 13 is a flow diagram illustrating a method of using a projection screen for receiving image light from an image source according to one embodiment of the present invention.

FIG. 13 is a flow diagram illustrating a method 800 of using a projection screen 600 for receiving image light 30 from an image source 40 according to one embodiment of the present invention. At 802, a substrate 502 having a plurality of features 504 is provided. Each of the features 504 includes a reflective surface 508. Each of the reflective surfaces 508 is curved in a first direction 510 to provide a desired horizontal viewing angle 602, and curved in a second direction 512 to provide a desired vertical viewing angle 604. At 804, the image source 40 is positioned at a position corresponding to a shape and orientation of the reflective surfaces 508. At 806, the image light from the image source is directed onto the reflective surface 508 of the features 504.

Although the foregoing has been a description and illustration of specific embodiments, various modifications and changes can be made by persons skilled in the art without departing from the scope and spirit of the subject matter.

What is claimed is:

1. A projection screen for receiving projector light from a projector facing direction, the screen comprising:
    a substrate having a plurality of features, each of the features including a reflective surface oriented to the projector facing direction, each of the reflective surfaces being curved in a first direction to provide a desired horizontal viewing angle, and curved in a second direction to provide a desired vertical viewing angle; and
    a plurality of absorptive recesses formed in the substrate.

2. The projection screen of claim 1, wherein each of the features is an arched conic section having a base and the reflective surface, and wherein the reflective surface extends from the base to a tip of the conic section.

3. The projection screen of claim 2, wherein the base of each of the features is an absorptive surface that is oriented substantially perpendicular to a plane of the projection screen.

4. The projection screen of claim 1, wherein each of the absorptive recesses includes a plurality of light absorbing surfaces, and wherein the plurality of features are separated from each other by the plurality of absorptive recesses.

5. The projection screen of claim 4, wherein the plurality of features and the plurality of recesses are uniformly positioned in two dimensions across a surface of the substrate.

6. The projection screen of claim 4, wherein each of the absorptive recesses is generally pyramidal in shape.

7. The projection screen of claim 1, wherein the plurality of features is formed on a hexagonal grid.

8. The projection screen of claim 1, wherein the substrate has been embossed to form the plurality of features.

9. The projection screen of claim 1, wherein the substrate is a light absorbing plastic film that has been embossed to form the plurality of features.

10. The projection screen of claim 1, wherein the substrate is fabricated of a light-absorbing material, and the reflective surfaces are formed by depositing light-reflective material at a glancing angle onto the substrate.

11. The projection screen of claim 1, wherein the plurality of features have an average feature length and width in a range from about 75 microns to 500 microns.

12. A method of creating a projection screen, comprising:
    forming a plurality of features on an absorptive substrate, each feature including a first surface curved in a first direction to provide a desired horizontal viewing angle, and curved in a second direction to provide a desired vertical viewing angle;
    forming a plurality of absorptive recesses in the substrate positioned between the plurality of features; and
    depositing a reflective material on the first surface of each of the features.

13. The method of claim 12, wherein each of the features is an arched conic section having a base and the first surface, and wherein the first surface extends from the base to a tip of the conic section.

14. The method of claim 13, wherein the base of each of the features is an absorptive surface that is oriented substantially perpendicular to a plane of the projection screen.

15. The method of claim 12, wherein each of the absorptive recesses is substantially pyramidal in shape.

16. The method of claim 12, wherein the plurality of features and the plurality of recesses are formed on a hexagonal grid.

17. The method of claim 12, wherein the plurality of features and plurality of recesses are formed by embossing.

18. The method of claim 12, wherein the reflective material is deposited at a glancing angle onto the substrate.

19. A method of using a projection screen for receiving image light from an image source, the method comprising:
    providing a substrate having a plurality of features and plurality of absorptive recesses, each of the features including a reflective surface, each of the reflective surfaces being curved in a first direction to provide a desired horizontal viewing angle, and curved in a second direction to provide a desired vertical viewing angle;
    positioning the image source at a position corresponding to a shape and orientation of the reflective surfaces; and
    directing image light from the image source onto the reflective surface of the features.

* * * * *

UNITED STATES PATENT AND TRADEMARK OFFICE
CERTIFICATE OF CORRECTION

PATENT NO. : 7,499,214 B2  Page 1 of 1
APPLICATION NO. : 11/590506
DATED : March 3, 2009
INVENTOR(S) : Thomas E Novet et al.

It is certified that error appears in the above-identified patent and that said Letters Patent is hereby corrected as shown below:

In column 14, line 40, in Claim 19, after "and" insert -- a --.

Signed and Sealed this

Twenty-eighth Day of July, 2009

JOHN DOLL
*Acting Director of the United States Patent and Trademark Office*